Figure 1:
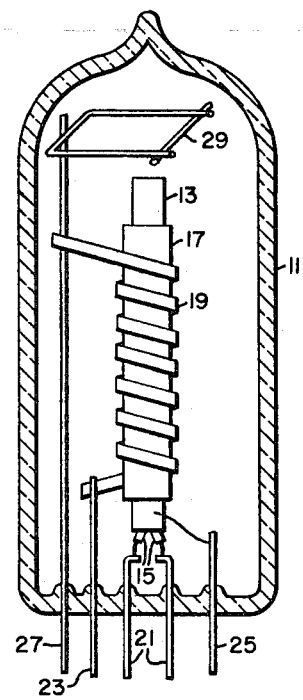

June 11, 1963

E. A. LEDERER 3,093,757

DEVICE FOR CONVERTING THERMAL ENERGY
INTO ELECTRICAL ENERGY

Filed Dec. 30, 1957

WITNESSES:
Bernard R. Gieguey
Edwin E. Bassler

INVENTOR
Ernest A. Lederer

BY Homer O. Blair

ATTORNEY

United States Patent Office 3,093,757
Patented June 11, 1963

3,093,757
DEVICE FOR CONVERTING THERMAL ENERGY INTO ELECTRICAL ENERGY
Ernest A. Lederer, Essex Fells, N.J., assignor to Westinghouse Electric Corporation, East Pittsburgh, Pa., a corporation of Pennsylvania
Filed Dec. 30, 1957, Ser. No. 706,040
5 Claims. (Cl. 310—4)

This invention relates to a device for converting thermal energy into electrical energy and, more particularly, to such a device in which an electron emitter is utilized.

It is an object of this invention to provide an improved device for converting thermal energy into electrical energy.

It is another object of this invention to provide an improved method of making a device for converting thermal energy into electrical energy.

It is a further object to provide an improved device for converting thermal energy into electrical energy in which an electron emitter is utilized.

Figure 2:
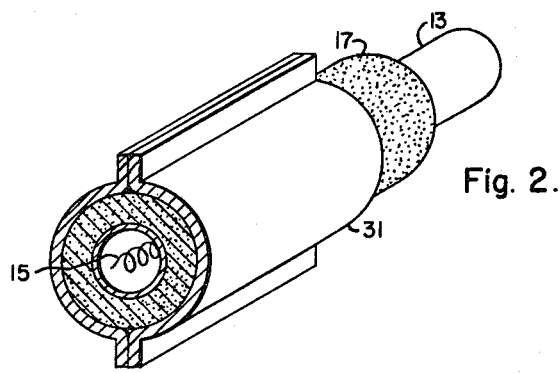

These and other objects of this invention will be apparent from the following description, taken in accordance with the accompanying drawing, throughout which like reference characters indicate like parts, which drawing forms a part of this application and in which:

FIGURE 1 is a side view of a thermal energy converter in accordance with one embodiment of my invention; and FIGURE 2 is a perspective sectional view of a thermal energy converter in accordance with another embodiment of my invention.

In accordance with my invention, a metallic sleeve member 13 is coated with a suitable coating material, which has the property that when it is heated under suitable conditions it will form a semiconducting electron emissive material. Suitable materials which I have utilized include the alkaline earth carbonates, such as barium carbonate, strontium carbonate, calcium carbonate, and mixtures or solid solutions thereof. This material may be coated upon conductive sleeve member 13 by any suitable method such as spraying, cat-coating, etc.

Next, a conductive collector member 19 is placed in intimate contact with the coating material. In the particular embodiment shown in FIG. 1, the conductive collector is in the form of a ribbon and this ribbon is wound around the semiconductor material. In this particular embodiment, I have found that it is frequently desirable to soak the coating material in a 1 to 5% solution of methyl methacrylate in 2-ethoxyethanol in order to facilitate the winding operation. Of course, it is understood that the conductive ribbon is merely one embodiment of my invention and the conductive collector member 19 may have a large number of variations as to form, such as that shown in FIGURE 2, described below. However, the conductive collector member 19 should be in intimate contact with the coating material.

Next, the assembly is heated in such a way so that the coating material is changed chemically and physically to a semiconductive electron emissive layer 17. One method of heating this device is by inserting a filamentary heater member 15 into the conductive sleeve member 13. The heater member 15 heats the conductive sleeve member 13 and in turn the coating material. The heating step should take place while the device is enclosed within a vacuum-tight envelope member 11 which may be made of a suitable insulating material or of any metal as desired. During the heating step the device should be attached to a vacuum system which should be pumped continuously. For example, if the coating material is barium-strontium carbonate and is heated to a temperature of about 1100° C. for a period of approximately five minutes, it is found that the coating material is changed to a semiconductor capable of emitting electrons when heated to approximately 1050° K. If the coating is made of a material such as barium carbonate, strontium carbonate, calcium carbonate and mixtures or solid solutions thereof, the semiconductive electron emissive material will be respectively barium oxide, strontium oxide, calcium oxide and mixtures or solid solutions thereof. It is found that during this decomposition when the coating material is a carbonate and the end material is an oxide, the coating loses approximately 20% of its weight. In addition, the coating sinters. The amount of sintering depends upon the composition of the mixture, its preparation, its particle size, the temperature of decomposition, deliberate or accidental admixtures, the quality of the substrate and probably a number of other factors.

In FIGURE 2 there is shown another embodiment of my invention in which a conductive collector member 31 is shown in the form of a solid sleeve member. Also shown are a conductive sleeve member 13, an emissive coating 17 and a heater member 15. Of course, the structure shown in FIG. 2 may be placed in an evacuated envelope in a manner similar to that shown in FIG. 1.

I have found that when these devices are operated in a vacuum that electrical energy is generated when heat is applied to the emissive layer 17 by such means as the heater member 15. For example, in FIG. 1 using a coated metallic sleeve member 13 about one and one-half inches long with a diameter (including the coating) of 0.060 inch and a metallic collector member 19 made from a nickel ribbon 0.020 inch wide and 0.002 inch thick with the turns spaced about 0.050 inch apart, a current of approximately 15 milliamperes is generated at about 0.45 volt when the emissive coating is heated to about 1000° to 1100° K.

As shown in the particular embodiment of FIG. 1, external connections are made through the envelope member 11 and include heater leads 21, a first collector member lead 23, a second collector member lead 27 and a sleeve member lead 25.

The collector member 19 or 31 may be made of any suitable conductive material. However, I have found that the higher the work function of the collector, the higher the electromotive force generated. Particular materials which I have found to be satisfactory include nickel, gold, copper and carbon. Also, I have found that the lower the work function of the emissive layer 17 the higher the electromotive force generated.

As it is important that the device be operated in a vacuum, it may frequently be desirable to include a gettering device 29 within the envelope member 11, as shown attached to the second collector member lead 27. In fact, I have found that the better the vacuum the higher the electromotive force generated.

It is also possible to use a semiconductive electron emissive material that need not be chemically changed before use. For example, as zirconium and titanium oxides are both stable in air, they may be used directly without previous formation of carbonates. Other suitable materials include cerium oxide, thorium oxide, barium titanate, barium beryllate and barium thoriate. It will be noticed that these materials and the previously discussed alkaline earth oxides are semiconductive, are electron emissive at high temperatures and may be heated to high temperatures, at least 1000° K. The above materials and the previously mentioned alkaline earth compounds may be used in mixtures with varying proportions and compositions. For example, barium-strontium oxide is one very effective material. Also, it has been found that oxides such as zirconium oxide and thorium oxide give higher electromotive forces at higher temperatures than those using barium and strontium oxide.

If the device uses barium oxide for the emissive layer, for example, the barium oxide is reduced in part to metallic barium during operation, which diffuses through the barium oxide coating to the surface and causes electron emission. The electrons move to the conductive collector member 19, and the passage of the electrons causes an electromotive force to be generated.

I have found that suitable materials of which the conductive sleeve member 13 may be made include nickel, nickel base alloys, platinum, copper, nickel-clad steel, tungsten, molybdenum and tantalum. The commercial nickel base alloys which have been used in the cathode art include silicon and other reducing agents which migrate toward the interface between the metallic sleeve member 13 and emissive layer 17 during the reduction and operation processes. The barium oxide, as mentioned above, is reduced in part to metallic barium by silicon and these other reducing agents and the by-product of this reaction, silicon dioxide, remains at the interface between the sleeve member 13 and the emissive layer 17. The silicon dioxide then reacts with the remaining barium oxide to form barium silicate which is an insulator and is very stable at high temperatures. If a space current is drawn during operation, barium ions in the coating migrate toward the interface between the conductive sleeve member 13 and emissive layer 17, penetrate the barium silicate and change the barium silicate insulator to a semiconductor. If no space current is drawn, the interface layer soon loses barium by evaporation and deteriorates within a comparatively short period of time. I have found that in order to extend the life of my device, very pure nickel alloys be utilized containing less than 0.02% silicon or, in effect, the sleeve material should be substantially free from silicon. Suitable materials would include nickel containing only a very small percent of carbon as a reducing agent or nickel containing a very small percentage of cerium as a reducing agent. Other suitable reducing agents which may be included in the nickel are barium, calcium, strontium, lithium and thorium.

The device as disclosed in the subject application has many uses and applications. For example, one such application is to use the device as a power supply for transistorized radio sets. In this case, the conductive sleeve member 13 is the positive terminal of the device, and the conductive collector member 19 or 31 is the negative terminal of the device. In this particular application it is desirable to generate as much current as possible at a lower terminal voltage. I have found that the current generated may be increased by lowering the cross resistance of the emissive coating 17. Various methods of lowering the cross resistance include (1) utilizing an active material for the base or substrate member (in the embodiment shown in FIG. 1 the conductive sleeve member 13 is the base member) such as a nickel alloy containing a suitable reducing agent or a material containing available barium metal; (2) one or several "hot shots" (heating the assembly for short times (10 to 100 seconds) to a high temperature, for example, 1200° C.) so as to develop free barium in the coating; (3) evaporation of the metallic element of the emissive layer on the completed assembly; for example, if baruim oxide is used, evaporation of barium would be suitable; (4) drawing a current with the conductive collector member 19 or 31 positive, thereby generating barium in the emissive layer; and (5) additions to the coating of materials that are innocuous to the emissive material of the emissive layer 17 but are capable of reducing the cross resistance. Suitable materials include calcium fluoride, cerium oxide, thorium oxide, lanthanum oxide, zinc oxide, magnesium oxide, etc. Such additions are very small and are of the order of 1% or less by weight.

Another application in which the device disclosed in this application is useful is that of a voltage generator supplying a negative grid bias to receiving tubes. In this case also the conductive sleeve member 13 is the positive terminal, and the conductive collector member 19 or 31 is the negative terminal of the device. However, in this application it is desired that the current output of the device be comparatively low with the result that the terminal voltage, everything else being equal, is comparatively high. The current output of the device may be lowered by increasing the cross resistance. In order to increase the cross resistance, additions of acidic and amphoteric oxides are recommended. For example, such materials as aluminum oxide, tungstic oxide, molybdic oxide, beryllium oxide, etc. may be added to the emissive layer 17 in very small quantities. Another means of increasing the cross resistance is exposing the emissive layer 17 to oxygen at low pressure or to chlorine, sodium chloride or other halogen compounds. Still another method of increasing the output voltage is using a conductive collector member 19 or 31 made of tungsten or molybdenum or using a conductive collector member 19 or 31 which has been plated with gold or copper.

Another application in which the device disclosed in this application is useful is that of generating electrical energy directly from atomic reactors. Reactors usually heat up a fluid such as pressurized water, sodium, etc. which is sent through a metal pipe to a heat exchanger which provides heat to operate a typical power generating plant. In other words the heat from the atomic reactor is used in a manner similar to heat generated by burning coal to generate steam which in turn is used to generate electricity. If the metal pipe is coated with an emissive layer 17 described above, a conductive collector member is positioned on the emissive layer 17 as described above, and the heat from the pipe is utilized to generate electricity directly. Of course metal sleeves may be placed around the pipe and then the coating may be placed on the sleeve. Also of course, the hot material from the pipe may be sent through a heat exchanger so that a higher temperature may be reached if necessary, and that heat be used to generate electricity by means of the disclosed invention.

While the present invention has been shown in a few forms only, it will be obvious to those skilled in the art that it is not so limited but is supsceptible to various changes and modifications without departing from the spirit and scope thereof.

I claim as my invention:

1. The method of making a vacuum device for converting thermal energy into electrical energy, said method comprising the steps of coating a conductive base member with at least one alkaline earth carbonate, placing a conductive collector member in intimate contact with the coating formed by said coating step and heating said coating, subsequent to said placing step, to reduce substantially all said carbonate to the corresponding oxide, thereby forming an electron emissive oxide layer, said layer being capable of being heated above 1000° K. to generate electrical energy between said conductive base member and said conductive collector member.

2. The method of making a vacuum device for converting thermal energy into electrical energy, said method comprising the steps of forming a first member having a surface comprised of coating material, said coating material being a material which is an electron emissive semiconductive material after being heated, placing a conductive collector member in intimate contact with said first member and heating said first member, subsequent to said placing step, so that substantially all of said coating material is an electron emissive semiconductive material.

3. The method of making a vacuum device for converting thermal energy into electrical energy, said method comprising the steps of coating a conductive sleeve member with a coating material selected from at least one of the group consisting of barium carbonate, strontium carbonate, calcium carbonate, cerium oxide, zirconium oxide, titanium oxide, thorium oxide, barium titanate, barium beryllate and barium thoriate, positioning a conductive ribbon around and in intimate contact with said coating material, placing a filamentary heater member inside said conductive sleeve member, heating said conductive sleeve member and thereby said coating material by means of said filamentary heater member, said heating step being done in a vacuum subsequent to said positioning step so that said heated material is an electron emissive semiconductive material selected from at least one of the group consisting of barium oxide, strontium oxide, calcium oxide, cerium oxide, zirconium oxide, titanium oxide, thorium oxide, barium titanate, barium beryllate, and barium thoriate, respectively.

4. The method of making a vacuum device for converting thermal energy into electrical energy, said method comprising the steps of coating a conductive sleeve member with a coating material selected from at least one of the group consisting of barium carbonate, strontium carbonate, calcium carbonate, cerium oxide, zirconium oxide, titanium oxide, thorium oxide, barium titanate, barium beryllate and barium thoriate, positioning a conductive ribbon around and in intimate contact with said coating material, placing a filamentary heater member inside said conductive sleeve member, heating said metallic sleeve member and thereby said coating material by means of said filamentary heater member, said heating step being done in a vacuum subsequent to said positioning step so that said heated material is converted to an electron emissive semiconductor material selected from at least one of the group consisting of barium oxide, strontium oxide, calcium oxide, cerium oxide, zirconium oxide, titanium oxide, thorium oxide, barium titanate, barium beryllate and barium thoriate respectively, said conductive sleeve member being substantially free of silicon.

5. A vacuum device for converting thermal energy into electrical energy, said device comprising a conductive base member, a conductive collector member spaced from said base member and an interposed body of electron emissive semiconductive material in the space between said base member and said collector member, said device being made by the method comprising the steps of coating said conductive base member with a coating material of at least one member of the group consisting of barium carbonate, strontium carbonate, calcium carbonate, cerium oxide, zirconium oxide, titanium oxide, thorium oxide, barium titanate, barium beryllate and barium thoriate, placing said conductive collector member in intimate contact with the surface of said coating material and heating said conductive base member, subsequent to said placing step, so that substantially all of said coating material is an electron emissive semiconductive material of at least one member of the group consisting of barium oxide, strontium oxide, calcium oxide, cerium oxide, zirconium oxide, titanium oxide, thorium oxide, barium titanate, barium beryllate and barium thoriate.

References Cited in the file of this patent
UNITED STATES PATENTS

| | | |
|---|---|---|
| 1,128,229 | Comstock | Feb. 9, 1915 |
| 1,860,187 | Koller | May 24, 1932 |
| 2,231,610 | Becker | Feb. 11, 1941 |
| 2,249,672 | Spanner | July 15, 1941 |
| 2,412,842 | Spenser | Dec. 17, 1946 |
| 2,527,984 | Bruining et al. | Oct. 31, 1950 |
| 2,607,901 | Rockwood et al. | Aug. 19, 1952 |
| 2,688,648 | McIlvaine | Sept. 7, 1954 |